Aug. 4, 1970   I. H. COHN ET AL   3,523,186
ATTITUDE ERROR CORRECTION FLUID GAUGING SYSTEM
EMPLOYING RADIATION DETECTORS AND ERROR
STORAGE TECHNIQUES
Filed Oct. 18, 1967

INVENTORS
IRVING H. COHN
FRANK DENARDO
BY Edwin E. Greigg
ATTORNEY

United States Patent Office 3,523,186
Patented Aug. 4, 1970

3,523,186
ATTITUDE ERROR CORRECTION FLUID GAUGING SYSTEM EMPLOYING RADIATION DETECTORS AND ERROR STORAGE TECHNIQUES
Irving H. Cohn, Terrace, and Frank DeNardo, Huntington, N.Y., assignors to Simmonds Precision Products, Inc., Tarrytown, N.Y., a corporation of New York
Continuation-in-part of application Ser. No. 589,631, Oct. 26, 1966. This application Oct. 18, 1967, Ser. No. 676,263
Int. Cl. G01n 21/26, 23/12
U.S. Cl. 250—43.5                    3 Claims

ABSTRACT OF THE DISCLOSURE

A fuel gauging system for containers in aircraft employing a radiation detection device and having an all digital system for correcting errors due to changes in attitude of the aircraft.

---

Figure 1:
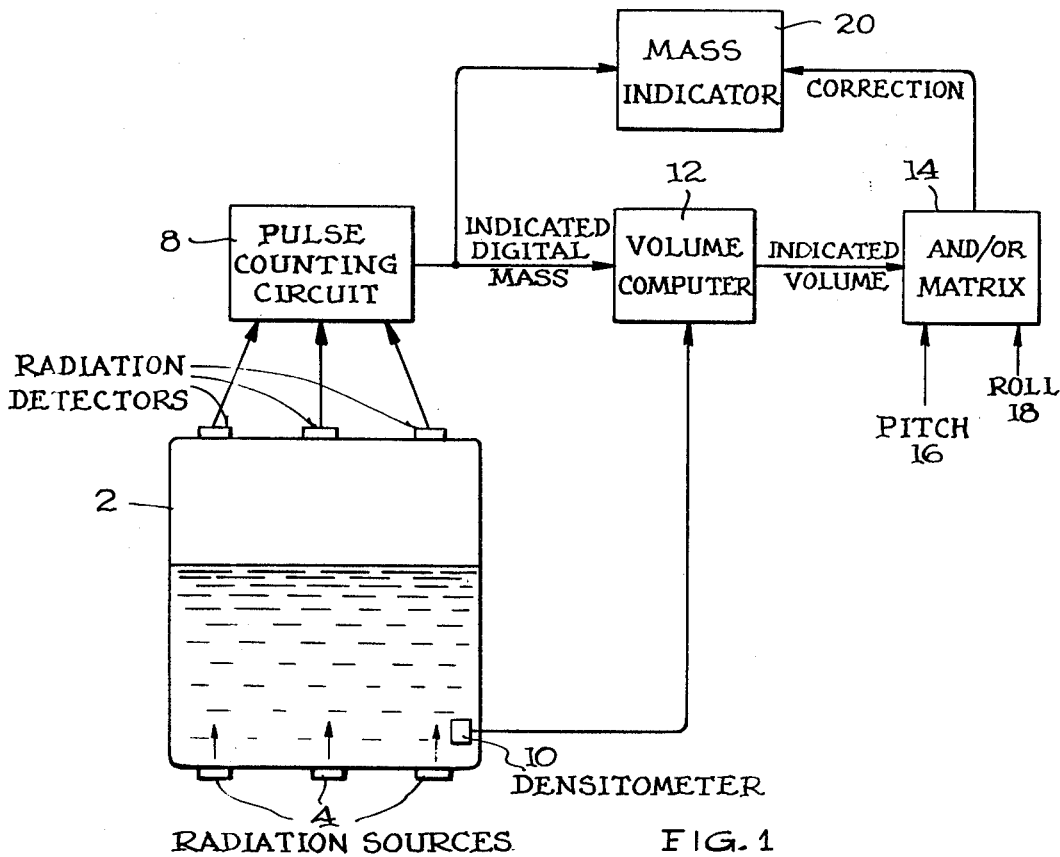

This application is a continuation-in-part of application Ser. No. 589,631, filed Oct. 26, 1966.

This invention relates to an attitude error correction system for fluid gauging in which a unique computer programming system cancels errors caused by attitude variations of the fluid with respect to its container and thereby provides a corrected indication of the quantity of fluid in the container.

In fluid gauging systems, particularly those systems for measuring aircraft fuel volume or weight, the sensing system is designed to minimize errors due to the aircraft's attitude, that is, its pitch and roll. Normally, sensing systems currently used consist of an appreciable number of capacitive sensing elements distributed in the fluid container or tank which is usually of an irregular shape. These sensing elements are then profiled, that is, their respective capacitances are varied with the height of the container in order to provide a current for a servo bridge indicator circuit which is linear with either volume or mass as desired.

Profiling of the capacitance sensor is normally determined by means of computer studies which optimize the capacitance probe sensors at the required attitudes of the aircraft and one of the results of such computer studies is a series of listings of calculated error at each fluid height and each required aircraft attitude. Experience has shown that the actual error in measurement obtained during testing with aircraft closely follows that predicted by the computerized results. It is therefore a purpose of this invention to utilize these error tabulations in order to correct indicated readings derived from a radiation gauging system and hence provide a system in which all errors caused by attitude variations of the aircraft are reduced to substantially zero. In a radiation gauging system the main problem has been accuracy due to attitude changes since the radiation paths cannot be profiled like a capacitance sensor. Thus, the system of the present invention serves to provide the necessary correction for attitude thereby reducing the number of radiation sources and detectors normally employed for the fuel gauging operation.

Accordingly, it is an object of this invention to provide a high speed computerized error correction system for use with fluid gauging employing radiation detection techniques.

It is yet another object of this invention to provide an error correction system which utilizes digital techniques for use with radiation detection fuel gauging systems.

It is yet another object of this invention to provide an error correction system for the attitude of aircraft to be used with a fuel gauging system in order to provide an accurate indication of the quantity of fuel regardless of the attitude of the aircraft or the apparent pitch and roll changes due to twist and deflection of the fuel tanks caused by fuel weight and aerodynamic loading.

It is still another object of this invention to provide an attitude correction system for use with a radiation detection fuel gauging system that employs a relatively small number of radiation sources and detectors.

In carrying out the objectives of this invention it is necessary to have available on a real time basis an indication of the actual aircraft pitch and roll. These indications may be obtained from either the aircraft attitude sensors of from suitable stable sensing devices employed for this particular purpose. A computer system is provided for listing a series of calculated errors at each fluid height (or volume) and each required aircraft attitude. The terms "volume" and "height" are used interchangeably since one output from the computer studies is a tabulation of height v. volume for all attitudes required. The attitude sensor inputs to the computer are compared with the inputs indicating the fuel volume which is derived from the radiation detectors, and a densitometer, and with the previous knowledge of actual errors obtained from the computer studies, correction will be made by way of a variable input current to a suitable mass indicator.

Figure 2:
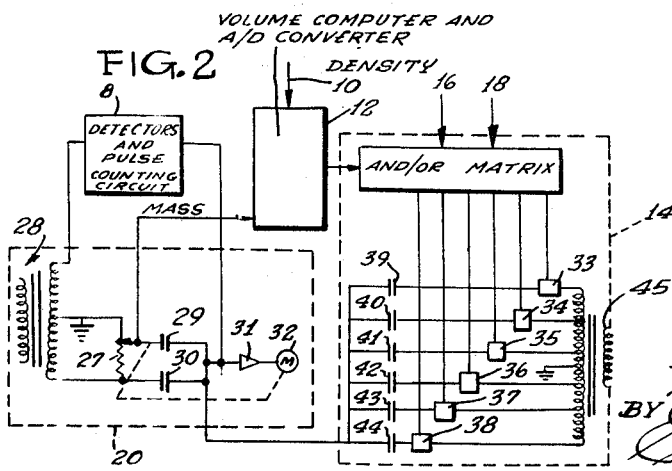

Other objects and advantages of this invention will become apparent upon a further study of the specification and drawing in which:

FIG. 1 is a symbolic diagram of a system arranged according to the concepts of this invention; and FIG. 2 is a schematic illustrating the circuitry details of the system shown in FIG. 1.

Referring now to FIG. 1, there is shown an all digital system in which a container or tank 2 having a quantity of fuel therein is located in the aircraft. A plural number of radiation sources 4 are positioned on the outside of the tank. These radiation sources provide penetrating gamma rays from cobalt-60 or krypton-85 or some such other suitable radiation source. Radiation detectors 6 of suitable conventional design pick up the gamma rays which have been attenuated in proportion to the fluid mass in the container 2. The detectors 6 are connected to a conventional pulse counting circuit 8 which provides a digital signal also proportional to indicated mass. An indicated volume signal is derived from the radiation detectors and a densitometer, the latter being mounted inside the tank 2 as shown. The densitometer 10 is fed along with the indicated digital mass signal to a volume computer which provides an indicated digital volume signal which is fed to an AND/OR matrix.

The AND/OR matrix also receives a set of pitch and roll digital signals. Pitch and roll attitudes are understood to be the attitude of the fuel surface with respect to a plane through the aircraft which is parallel to the ground when the aircraft is at ground attitude. The aircraft attitude sensor will provide readings under all conditions of pitch attitude except during pitch changes. The required roll attitudes may be obtained from a suitable pendulum-type or spirit level-type sensor. As an example, the aircraft may be rolled to +20°, but if it is in a controlled turn, the fuel surface attitude may be zero. Thus, utilizing digital techniques, these attitude signals are fed along digital lines 16 and 18 into the AND/OR matrix 14. Simultaneously, the fuel volume input signal is introduced into the AND/OR matrix from the volume computer 12.

The input signals to the AND/OR matrix 14 will then combine pitch, roll and volume, all of which occur simultaneously which can be shown from a preselected set of computer error curves to have associated therewith a particular known error. When any one of a given number of combinations of signals occur, one or more AND gates are fired which, in turn, provide a correction signal to the mass indicator.

As described in application Ser. No. 589,631, above-referred to and as shown more specifically in FIG. 2, the mass indicator 20 may be of the conventional analog type and, accordingly, it will suffice to only summarily describe its operation. The mass gauge 20 comprises a transformer 28 with one end terminal of its secondary winding connected to the output of the pulse counting circuit 8. The secondary winding is provided with a center tap shown connected to ground. A fixed capacitor 30 is connected between the other end terminal of the secondary winding and the input to the amplifier 31. A rebalancing potentiometer 27 is connected across the lower half of the secondary winding between the center tap and the last-mentioned terminal. The slider of the potentiometer is connected to a fixed capacitor 29 and to the input of amplifier 31. The transformer 28 is provided with a primary winding which may be connected to a source of alternating current operating at 400 cycles. The amplifier 31 has its input connected to the output of the bridge circuit between ground and its input. The output of the amplifier 31 is coupled to a conventional phase rebalancing motor 32 and to the slider of the potentiometer 27. Thus, in the circuit described if there is any change in the signals from the pulse counting circuit 8, this change will be supplied to the motor 32 causing it to re-position the slider of the potentiometer 27 in a direction tending to reduce the signal to zero and rebalance the bridge. It will be seen that the position of a suitable servo indicating pointer (not shown) normally connected to the rebalancing potentiometer 27 will continuously change as the pulse counting circuit senses the fuel depletion in the tank, as previously described, and thus indicate the mass of fuel in the tank.

The voltage at the rebalancing potentiometer arm is then proportional to the measured mass and this signal is divided by the density signal by direct digital means, for example, the A/D converter 12. This digital indicated volume signal now feeds the AND/OR matrix 14. It will be seen that the input signal to the AND/OR matrix 14 will combine pitch, roll and volume. When any one of a given number of combinations of signals occur, one or more AND gates are fired which, in turn, activate one or more solid state switches 33, 34, 35, 36, 37 and 38, as shown. These switches connect capacitors 39, 40, 41, 42, 43 and 44 to a given portion of the secondary of the transformer 45 such that a correcting current of the proper magnitude is fed to the input of amplifier 31 of the mass gauge 20. This corrective current causes the motor 32 to turn and hence moves the pointer of the rebalancing potentiometer to the correct position thereby removing the previous error. Although the above steps have been described sequentially, the action will be so fast as to appear simultaneous with any change of roll, pitch and volume.

As a result of utilizing radiation detection techniques with the principles of this invention, it is possible to reduce the number of radiation sources mounted on the tank 2 and still obtain an accurate indication of the quantity of fuel in the tank 2.

The pitch and roll signals 16 and 18 may include changes in attitude due to twist and deflection of wing tanks caused by fuel weight and aerodynamic loading. Suitable sensors for detecting such changes may conveniently be provided for this purpose.

What is claimed is:

1. In an error correction system for use with a fluid gauge employing a container having a quantity of fluid therein, a source of radiation mounted on the outside of the container, detector means for detecting the radiation from said sources, a pulse counting circuit connected to said radiation detector providing a digital signal proportional to the mass of fluid in said container, said digital signal being fed to a mass indicator, a densitometer mounted within said container in contact with said fluid, volume computer means connected to said densitometer, said digital mass signal being fed to said volume computer means, an AND/OR matrix connected to the output of said volume computer means, a digital signal representing error associated with said digital mass signal supplied to said AND/OR matrix, error storage means in said matrix responsive to said error signal and a correction signal output from said matrix being supplied to said mass indicator.

2. In an error correction system for use with a fluid gauge employing a container having a quantity of fluid therein, a source of radiation on the outside of said container, radiation detecting means positioned on said container and opposite said source, a pulse counting circuit connected to said detecting means for providing a digital mass signal proportional to said quantity of fluid, indicating means for said mass signal, an AND/OR matrix having a digital input signal representing error associated with said digital mass signal, volume computing means for converting said digital mass signal to a volume digital signal, said volume digital signal being fed to said AND/OR matrix, error storage means in said matrix responsive to said error signal and said matrix having a correction signal output connected to said mass indicator.

3. In an error correction system for use with a fluid gauge employing a container having a quantity of fluid therein, a source of radiation on the outside of said container, radiation detecting means positioned on said container and opposite said source, a pulse counting circuit connected to said detecting means for providing a digital mass signal proportional to said quantity of fluid, indicating means for said mass signal, an AND/OR matrix having a digital input signal representing error associated with said digital mass signal, volume computing means for converting said digital mass signal to a volume digital signal, said volume digital signal being fed to said AND/OR matrix, error storage means in said matrix responsive to said error signal and said AND/OR matrix having a correction signal output connected to said mass indicator.

References Cited

UNITED STATES PATENTS 2,830,183   4/1958   Wolfe.
2,952,774   9/1960   Howard.

RALPH G. NILSON, Primary Examiner

M. J. FROME, Assistant Examiner

U.S. Cl. X.R.

73—290; 250—83.3; 318—18